(12) United States Patent
Daudel et al.

(10) Patent No.: US 6,598,395 B2
(45) Date of Patent: Jul. 29, 2003

(54) EXHAUST-GAS TURBOCHARGER

(75) Inventors: Helmut Daudel, Schorndorf (DE); Stephan Schenkel, Stuttgart (DE); Joseph Spurk, Bad König (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/165,172

(22) Filed: Jun. 7, 2002

(65) Prior Publication Data

US 2002/0184882 A1 Dec. 12, 2002

(30) Foreign Application Priority Data

Jun. 8, 2001 (DE) .......................... 101 27 916

(51) Int. Cl.⁷ ............................ F02B 37/00; F02D 23/00
(52) U.S. Cl. ................... 60/602; 60/605.1; 123/559.1
(58) Field of Search .................. 60/605.1, 602, 60/605; 123/559.1, 559.2, 563

(56) References Cited

U.S. PATENT DOCUMENTS

| 1,816,787 A | | 7/1931 | Moss |
| 4,565,068 A | * | 1/1986 | Schneider ................. 60/602 |
| 4,729,715 A | * | 3/1988 | Wilde ..................... 415/150 |
| 5,380,169 A | * | 1/1995 | Eisenmann ............... 417/284 |
| 6,158,422 A | * | 12/2000 | Blank et al. ............ 123/559.2 |

FOREIGN PATENT DOCUMENTS

DE 1 253 510 11/1967

* cited by examiner

Primary Examiner—Hoang Nguyen
(74) Attorney, Agent, or Firm—Klaus J. Bach

(57) ABSTRACT

In an exhaust-gas turbocharger having a compressor and an exhaust-gas turbine, which drives the compressor and comprises a multipart exhaust gas supply duct manifold and a turbine rotor, to which pressurized exhaust gas can be delivered by way of the exhaust gas supply duct, the exhaust gas supply duct manifold includes at least three flow passages, which, except for one, are provided with shut-off flaps, which are adjustable independently of one another.

12 Claims, 3 Drawing Sheets

EXHAUST-GAS TURBOCHARGER

The invention relates to an exhaust-gas turbocharger including a compressor and a turbine disposed in a housing with multiple exhaust gas supply passage of which some can be closed by adjustable shut-off flaps.

BACKGROUND OF THE INVENTION

The publication US 18 16 787 describes a multi-cylinder internal combustion engine, which is equipped with an exhaust-gas turbocharger, which comprises a compressor in the inlet duct of the internal combustion engine and an exhaust-gas turbine in the exhaust duct. The exhaust gas turbine is driven by the pressurized exhaust gases from the internal combustion engine, the rotation of the turbine being transmitted, by way of a common shaft, to the compressor, which draws in the combustion air and compresses it to an increased charge-air pressure, under which the combustion air is delivered to the cylinder inlets of the internal combustion engine. In order to be able to adjust the turbocharger output, the exhaust gas is delivered to the turbine rotor by way of three flow ducts, in each of which a valve is arranged, whose position can be adjusted by way of a common control rod as a function of the charge-air pressure, so as to compensate for pressure fluctuations. No provision is made here for any independent adjustment of the opening cross section of each flow duct, the valves in the flow ducts instead being opened or closed in a set order through the actuation by means of the control rod. In the exhaust-gas turbocharger according to US 18 16 787 no further adjustment facilities are provided other than the atmospheric pressure compensation.

Another problem is that the shut-off valves in the flow ducts are designed as pivoted flaps, the pivot axes of which extend approximately centrally through the respective flow duct, so that even in its open position the shut-off valve forms an obstacle to the flow of the exhaust gas.

Another exhaust-gas turbocharger is disclosed by the generic publication DE-AS 1 253 510. The exhaust-gas turbine of this exhaust-gas turbocharger comprises two parallel exhaust manifolds, which each open into a spiral section, which radially surrounds part of the turbine rotor. A pivotal shut-off flap, which can be pivoted between a shut-off position closing the flow inlet of the exhaust manifold and an open position exposing it is arranged in the area of the flow inlet of one of the two exhaust manifolds. In the open position, the shut-off flap is accommodated in a correspondingly shaped recess in the inside wall of the turbocharger housing, thereby avoiding any adverse effect on the flow of exhaust gas entering. No shut-off flap is provided in the area of the second exhaust manifold; the second exhaust manifold remains permanently opened.

For adjustment of the turbocharger output, the shutoff flap can be adjusted between its open position and its shut-off position, so that given an identical cross section in both exhaust manifolds the total unrestricted inlet cross section available to the exhaust gas inlet flow can be approximately doubled.

It is the main object of the invention to provide an exhaust-gas turbocharger that is variably adjustable.

SUMMARY OF THE INVENTION

In an exhaust-gas turbocharger having a compressor and an exhaust-gas turbine, which drives the compressor and comprises a multi-part exhaust gas supply duct manifold and a turbine rotor, to which pressurized exhaust gas can be delivered by way of the exhaust gas supply duct, the exhaust gas supply duct manifold includes at least three flow passages, which, except for one, are provided with shut-off flaps, which are adjustable independently of one another.

This arrangement allows a maximum number of adjustments for the admission of exhaust gas to the turbine rotor to be achieved using a minimum number of shut-off flaps. The independent adjustment of the shut-off flaps enables the existing flow ducts to be interconnected in any combination, in order to provide a greater or lesser overall cross section for the delivery of exhaust gas, at least the one flow duct having no flap being permanently open, so that a minimum of exhaust gas is delivered to the exhaust gas turbine in any operating condition of the internal combustion engine.

A further advantage lies in the simplicity of the design. In contrast to exhaust-gas turbines having a variable turbine geometry achieved, for example, by means of a guide baffle with adjustable guide vanes, so that a multiplicity of moveable components have to be adjusted, which increase the susceptibility to malfunction, in the simplest design of the exhaust-gas turbocharger according to the invention, having a total of three flow ducts, only two shutoff flaps are needed, which are arranged in two of the three flow ducts for adjustment of the unrestricted inlet cross section. This reduces the number of moving parts considerably. At the same time, however, the various possible combinations of opened and closed shut-off flaps, available even in the simplest version with three flow ducts, mean that up to four different-sized overall inlet cross sections can be set for the delivery of exhaust gas, which is usually sufficient for all operating conditions both during engine power operation and during engine braking of the vehicle.

Through an adept choice of inlet cross sections for the flow ducts—such as two flow ducts of equal cross section, one flow duct with a cross section twice as large, for example—four overall inlet cross sections, divided up in the size ratio 1:2:3:4, can be exposed for the various operating conditions of the internal combustion engine.

In an advantageous embodiment, at least two shut-off flaps are arranged in the two outer flow ducts, and supported so that they are capable of pivoting onto the inside wall of the turbine housing. In this design at least one flow duct, situated in the middle between the two outer ducts, is designed without a flap, the middle flow duct and the two outer flow ducts in each case sharing a common wall in the event of there being a total of just three flow ducts.

The shut-off flaps are advantageously designed to conform to the contour of the inside wall of the turbine housing and in the open position fit precisely against the inside wall, thereby presenting the least possible flow resistance to exhaust gas flowing in. The outside of the shut-off flap remote from the inside wall of the turbine housing and facing the flow duct may here have a flow-enhancing contour in order to further minimize the flow resistance and to obtain any desired flow effects, such as an acceleration of the flow through tapering of the unrestricted inlet cross section.

It may also be appropriate, however, to incorporate a recess, designed to conform to the shut-off flap, into the inside wall, in which recess the shut-off flap can be received in the open position. In this design the shut-off flap in the open position can be fully accommodated in the recess, thereby providing for a smooth inside wall surface.

In order to improve the flow ratios over the turbine rotor a fixed guide baffle may be provided in a duct upstream of the turbine rotor, the duct being connected to, or being part of, the exhaust manifold. In an alternative version, the guide baffle may also be variably adjustable, being axially insertable into the guide channel, for example, or equipped with adjustable guide vanes. A variable turbine geometry is thereby achieved, which permits a multiplicity of possible adjustments of the unrestricted inlet cross section.

The exhaust manifold—with or without guide baffle—is advantageously divided into a plurality of angular sections, which are hermetically separated from one another, precisely one angular section in the guide channel being assigned to each flow duct. The ratio of the angular sections advantageously corresponds to the ratio of the flow duct cross sections, so that a double angular section is also assigned to the flow duct having twice the cross section.

The invention will become more readily apparent from the following description thereof on the basis of the accompanying drawings:

DESCRIPTION OF PREFERRED EMBODIMENTS

In the figures, identical components are provided with identical reference numbers.

Figure 1:
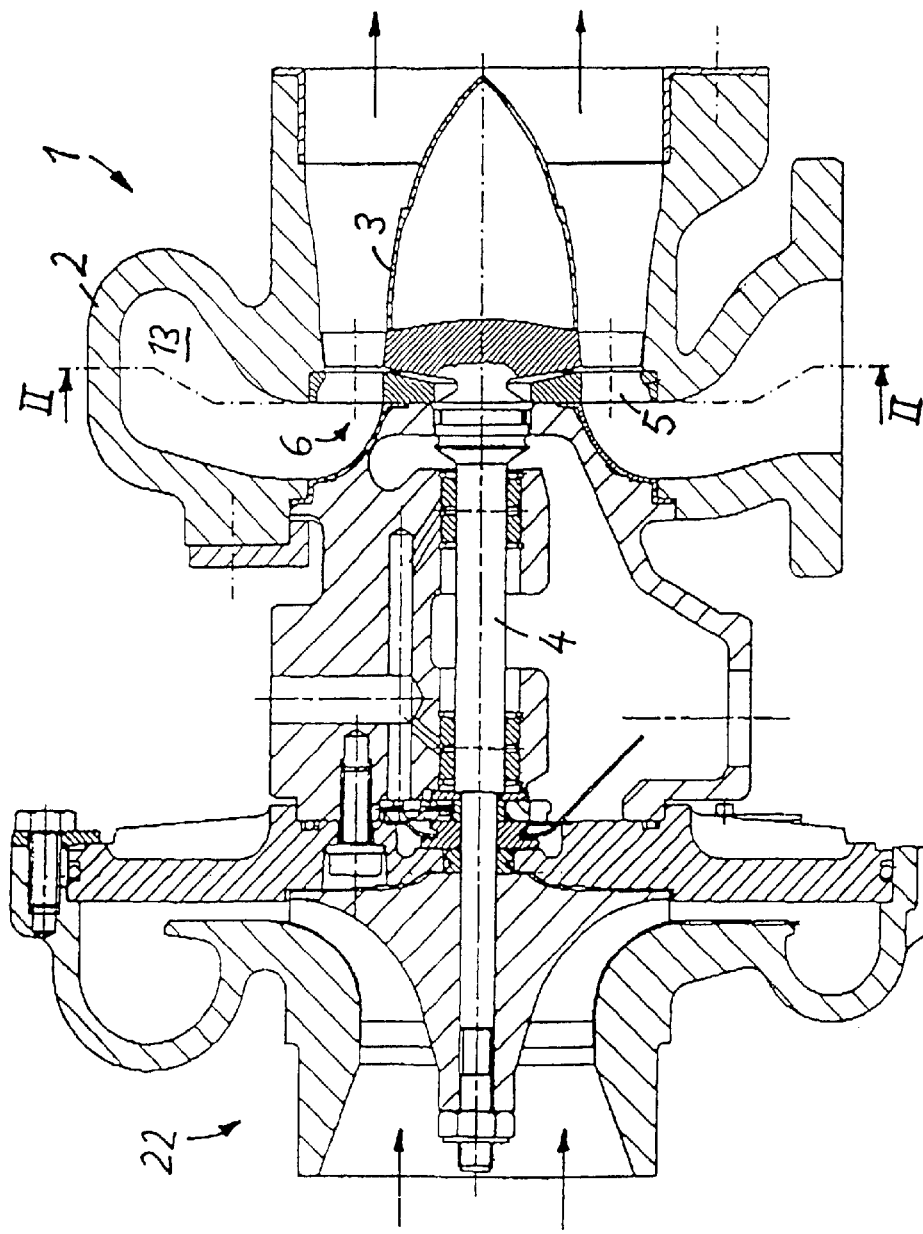
FIG. 1 shows a longitudinal section through an exhaust-gas turbocharger.

The exhaust-gas turbocharger for an internal combustion engine represented in FIG. 1 comprises an exhaust-gas turbine 1 having a turbine rotor 3, which is rotatably mounted in a turbine housing 2, and whose rotation is transmitted, by way of a shaft 4, to a compressor impeller of a compressor 22 for the compression of intake air. The exhaust-gas turbine 1 is suitably designed as an axial-flow impulse action turbine.

A fixed, immovable guide baffle 5, which serves to optimize the flow ratios of the exhaust gas striking the turbine rotor, is arranged in an exhaust manifold 6 positioned axially upstream of the turbine rotor 3, through which manifold the exhaust gas from the internal combustion engine is to be delivered axially to the turbine rotor and which is connected to a collecting chamber 13 in the turbine housing.

Figure 2:
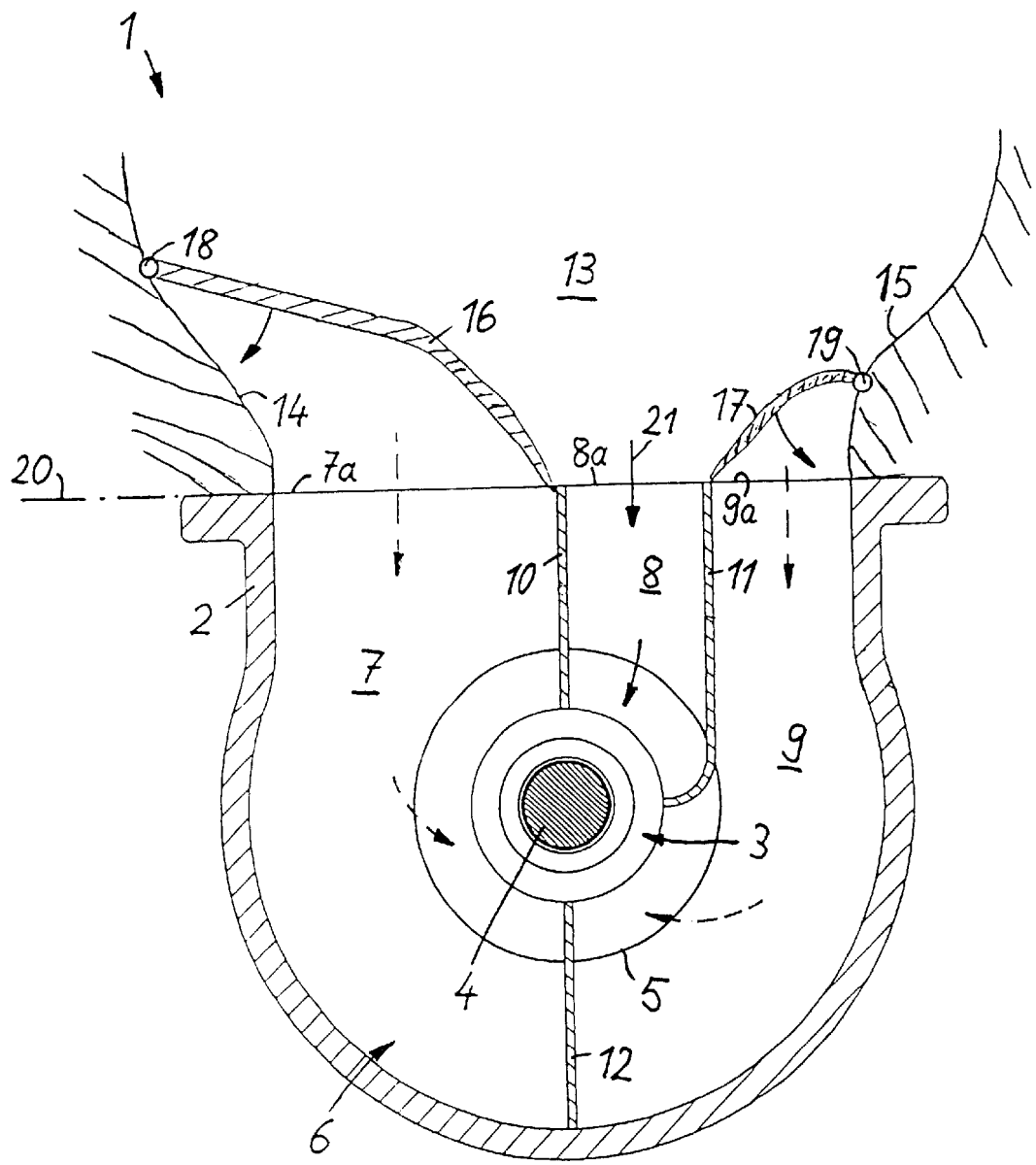
FIG. 2 shows an exhaust-gas turbine of an exhaust-gas turbocharger in a sectional view taken along the line II—II in FIG. 1.

According to FIG. 2 the exhaust manifold 6, positioned axially upstream of the turbine rotor 3, is divided by means of wall plates 10, 11, 12 in the turbine housing 2 into a total of three flow ducts 7, 8, 9. The exhaust manifold 6 is of approximately annular construction, a first flow duct 7 of the exhaust manifold 6 covering an angle range of approximately 180°, which is defined by the two wall plates 10 and 12. A second, middle flow duct 8, which is separated from the two outer flow ducts 7 and 9 by the wall plates 10 and 11, extends over an angular section of approximately 90° of the exhaust manifold 6 in front of the turbine rotor. The third flow duct 9, which, like the first flow duct 7, is designed as an outer flow duct, is bounded by the wall plates 11 and 12 and likewise extends over an angular section of approximately 90° of the exhaust manifold. Each flow duct 7 to 9 shares one common wall plate with each of the other two flow ducts.

The collecting chamber 13 is arranged upstream of the exhaust manifold 6. The collecting chamber 13 is likewise an integral part of the exhaust-gas turbine 1; the exhaust gases from the exhaust of the internal combustion engine are fed into this chamber. The collecting chamber 13 is connected to inlet cross sections 7a, 8a and 9a of the flow ducts 7, 8 and 9, the inlet cross sections 7a, 8a, and 9a lying in a common admission flow plane 20, which separates the collecting chamber 13 from the exhaust manifold 6. Two shut-off flaps 16 and 17, by means of which the unrestricted inlet cross sections 7a and 9a of the two outer flow ducts 7 and 9 can be closed or opened, are pivotally mounted by way of articulations 18 and 19 on the inside walls 14 and 15 of the collecting chamber 13. The inlet cross sections 8a and 9a of the middle flow duct 8 and of the second outer flow duct 9 are of approximately equal size and each occupy approximately one quarter of the overall flow cross section in the admission flow cross-section 20. The inlet cross section 7a of the first outer flow duct 7 occupies approximately half the overall inlet cross section and is therefore approximately twice as large as each of the other two inlet cross sections 8a and 9a.

The wall plates 10, 11 and 12 extend essentially parallel to one another, the wall plates 10 and 11 between the middle flow duct 8 and each of the outer flow ducts 7 and 9 being situated at approximately the same height and the further wall plate 12 being arranged on that side of the turbine rotor 3 situated 180° opposite, between the two outer flow ducts 7 and 9.

The shut-off flaps 16 and 17 can be actuated independently of one another and can each be adjusted between a shut-off position, closing the unrestricted inlet cross section 7a or 9a, and an open position, in which the respective inlet cross section is exposed. In the representation shown in the figure both shut-off flaps 16 and 17 are in their shut-off position, so that only the middle inlet cross section 8a of the middle flow duct 8 is open and all exhaust gas is delivered to the turbine rotor 3 in the direction of the arrow 21 through the middle flow duct 8. In the open position of the shut-off flap 17 of the second, outer flow duct 9, the inlet cross section 9a is also exposed in addition, so that the total unrestricted inlet cross section available for admission of the exhaust gas comprises the individual cross sections 8a of the middle flow duct and 9a of the second, outer flow duct, provided that the shut-off flap 16 of the first flow duct 7 remains in its shut-off position. If, on the other hand, the shutoff flap 16 of the first flow duct 7 is in the open position and the second shut-off flap 17 of the opposite outer flow duct 9 is in the shut-off position, the total unrestricted inlet cross section available comprises the individual cross sections 7a and 8a of the first, outer flow duct 7 and the middle flow duct 8. If both shut-off flaps 16 and 17 are in their open position, a maximum inlet cross section is provided, which comprises the individual cross sections 7a, 8a, and 9a of all three flow ducts 7 to 9.

The wall plates 10, 11 and 12 between the flow ducts 7, 8 and 9 divide the exhaust manifold into different angular sections, hermetically separated from one another, in such a way that the ratio of the respective angular sections corresponds to the ratio of the unrestricted inlet cross sections 7a, 8a and 9a of the relevant flow duct.

The shut-off flaps 16 and 17 are suitably designed to conform to the contour of the inside wall 14 and 15 of the collecting chamber 13, so that, in their open positions, the shut-off flaps fit precisely against the inside wall 14 and 15. If necessary, only that wall side of each shut-off valve 16 and 17 facing the inside wall is designed to conform to the contour of the inside wall, whereas the outside may assume a different form and may, in particular, be optimized with regard to the fluid mechanics. In the shutoff position the unexposed face of each shut-off flap 16 and 17 bears against the wall plate 10 and 11 respectively between the adjacent flow ducts 7 and 8 or 8 and 9.

Figure 3:
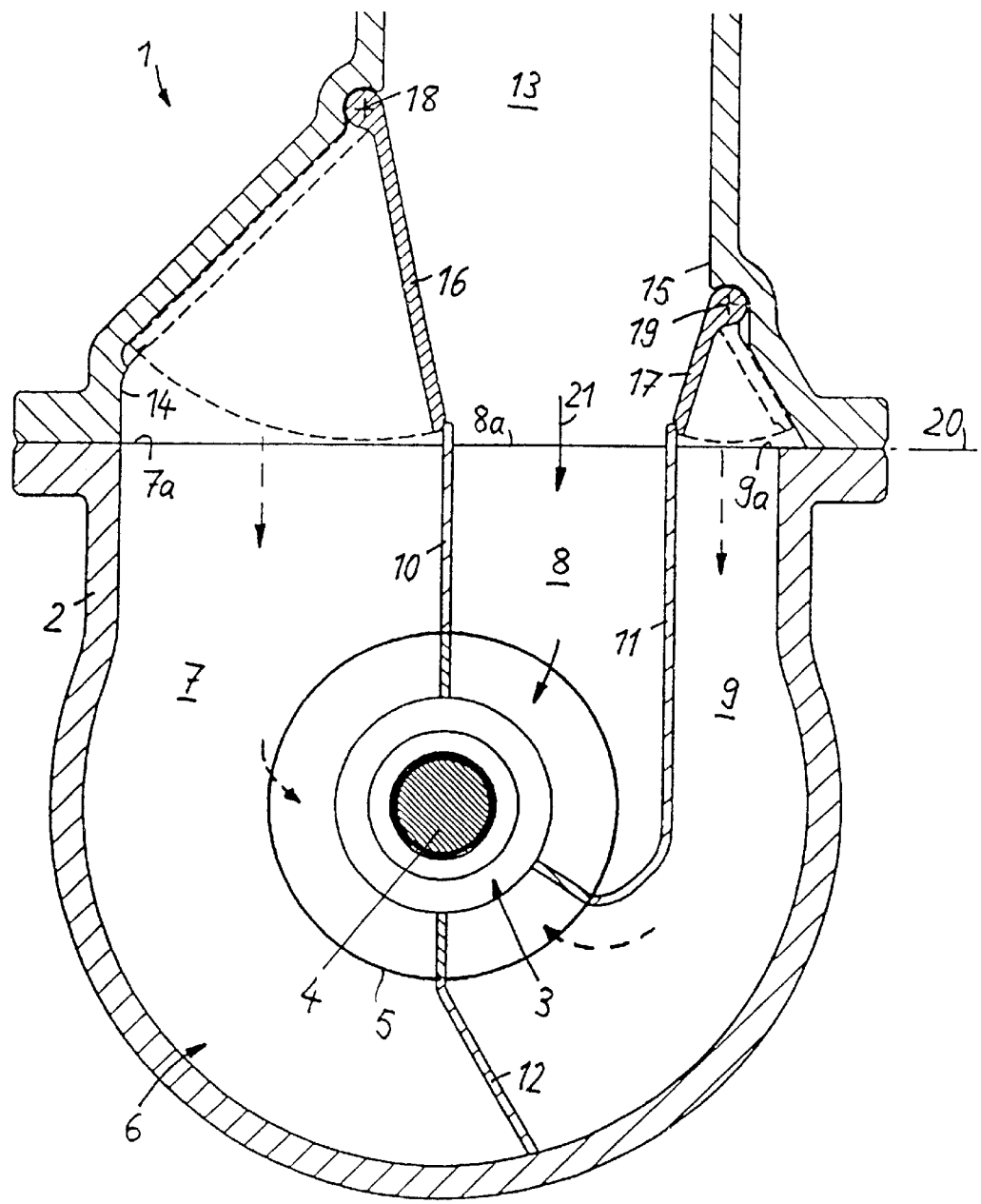
FIG. 3 shows an exhaust-gas turbine comparable to FIG. 2, but with a different division of the areas of the inlet cross sections in the exhaust manifold of the turbine.

The design according to FIG. 3 differs from that according to FIG. 2 in the ratio of the inlet cross sections 7*a*, 8*a* and 9*a* of the flow ducts 7, 8 and 9 to one another. The inlet cross section 7*a* of the left-hand, outer flow duct 7 occupies half of the total inlet cross section in the admission flow plane 20. The inlet cross section 8*a* of the middle flow duct 8 is approximately twice as large as the inlet cross section 9*a* of the right-hand outer flow duct 8, which taken together cover the remaining half of the total inlet cross section, so that the inlet cross sections 7*a*, 8*a* and 9*a* of the flow ducts are in a ratio of 3:2:1 to one another. It is therefore possible, through corresponding flap positions, to open the total cross section by one third, by half, by five sixths or completely.

In the open position, the shut-off flaps 16 and 17 are accommodated in recesses in the respective inside walls 14 and 15 of the collecting chamber 13, so that in the open position there is a smooth, unobstructed inside wall surface without increased flow resistance.

Use of the invention in a radial-flow turbine and/or a mixed-flow turbine may also be considered as an alternative to an axial-flow impulse action turbine.

What is claimed is:

1. An exhaust-gas turbocharger including a compressor and an exhaust-gas turbine, which drives the compressor, said turbine comprising a turbine housing having an exhaust gas inlet and a turbine rotor, to which pressurized exhaust gas can be delivered by way of the exhaust gas inlet, said exhaust gas inlet being of multipart design with at least three flow ducts a number of which flow ducts can each be closed by a shut-off flap pivotally supported in the respective flow duct, at least one of said flow ducts being designed without any flap, all shut-off flaps being adjustable independently of one another.

2. An exhaust-gas turbocharger according to claim 1, wherein said exhaust gas inlet includes two outer flow ducts each being provided with a shut-off flap.

3. An exhaust-gas turbocharger according to claim 2, wherein the shut-off flaps are pivotally supported in such a way that they are disposed adjacent an inside wall of the turbine housing when they are open.

4. An exhaust-gas turbocharger according to claim 3, wherein the shut-off flaps are pivotally supported on an inside wall of a collecting chamber in the turbine housing, from which the flow ducts branch off, the shut-off flaps being arranged in the area of the inlets of the flow ducts.

5. An exhaust-gas turbocharger according to claim 1, wherein the shut-off flaps are designed to conform to the contour of the inside wall of the turbine housing and, in an open position, fit precisely against the inside wall.

6. An exhaust-gas turbocharger according to claim 1, wherein the flow ducts extend essentially parallel.

7. An exhaust-gas turbocharger according to claim 1, wherein at least some of the flow ducts have different inlet cross sections.

8. An exhaust-gas turbocharger according to claim 7, wherein a total of three flow ducts are provided, of which two flow ducts have an inlet cross-section essentially equal in size and one flow duct has an inlet cross section essentially twice as large as each of the other two flow ducts.

9. An exhaust-gas turbocharger according to claim 7, wherein a total of three flow ducts are provided, the inlet cross sections of which are in a ratio of 3:2:1 to one another.

10. An exhaust-gas turbocharger according to claim 1, wherein a flow guide vane structures disposed upstream of the turbine rotor for directing the exhaust gas onto the turbine rotor.

11. An exhaust-gas turbocharger according to claim 1, wherein the exhaust manifold is divided into hermetically separated angular sections, one angular section being assigned to each flow duct.

12. An exhaust-gas turbocharger according to claim 11, wherein the ratio of the angular sections corresponds to the ratio of the inlet cross sections of the flow ducts.

* * * * *